April 28, 1964   W. F. DUNN ETAL   3,131,040
WATER SEPARATOR
Filed Dec. 23, 1960

INVENTORS:
IRVING G. AUSTIN,
WINFRED F. DUNN,
BY
J. Thomas Eubanks
Attorney.

3,131,040
WATER SEPARATOR
Winfred F. Dunn, Woodland Hills, and Irving G. Austin, Inglewood, Calif., assignors to The Garrett Corporation, Los Angeles, Calif., a corporation of California
Filed Dec. 23, 1960, Ser. No. 77,869
5 Claims. (Cl. 55—159)

This invention relates to apparatus for separating liquids from gases or gaseous fluids.

The invention has particular utility in air conditioning systems such as those employed for conditioning the air delivered to a compartment or enclosure. However, it is to be understood that its utility is not limited to such systems since many other applications are possible, as will be apparent to those skilled in the art.

Heretofore, in apparatus employed to remove moisture from air delivered to an enclosure, the moisture was condensed or coalesced into water droplets and the droplets were conveyed or blown to a collector section of the apparatus where they gravitated to the lower portion of the section. The water collected in the apparatus was drained from the apparatus by means of a valved drain located on the bottom of the collector section.

A disadvantage of the above-described separator is that since the force of gravity is required to make the collected water flow to the lower portion of the collector section, the separator could not be utilized under conditions of zero gravity. Another disadvantage of such a separator is that even if the collected water gravitated to the lower portion of the collector section the water could not be drained from the apparatus if the apparatus were disposed so that the valved drain was in a position other than at the bottom of the collector section.

It is an object of the present invention to overcome the above disadvantages of prior water separators by providing a separator wherein the collection and removal of the moisture in the fluid is not dependent upon, or affected by, gravity.

It is another object of the invention to provide a water separator wherein all the collected water may be cyclically drained from the apparatus irrespective of the attitude of the separator.

It is still another object of the invention to provide a water separator wherein a fluid actuator is utilized to remove the collected water from the separator.

Figure 1:
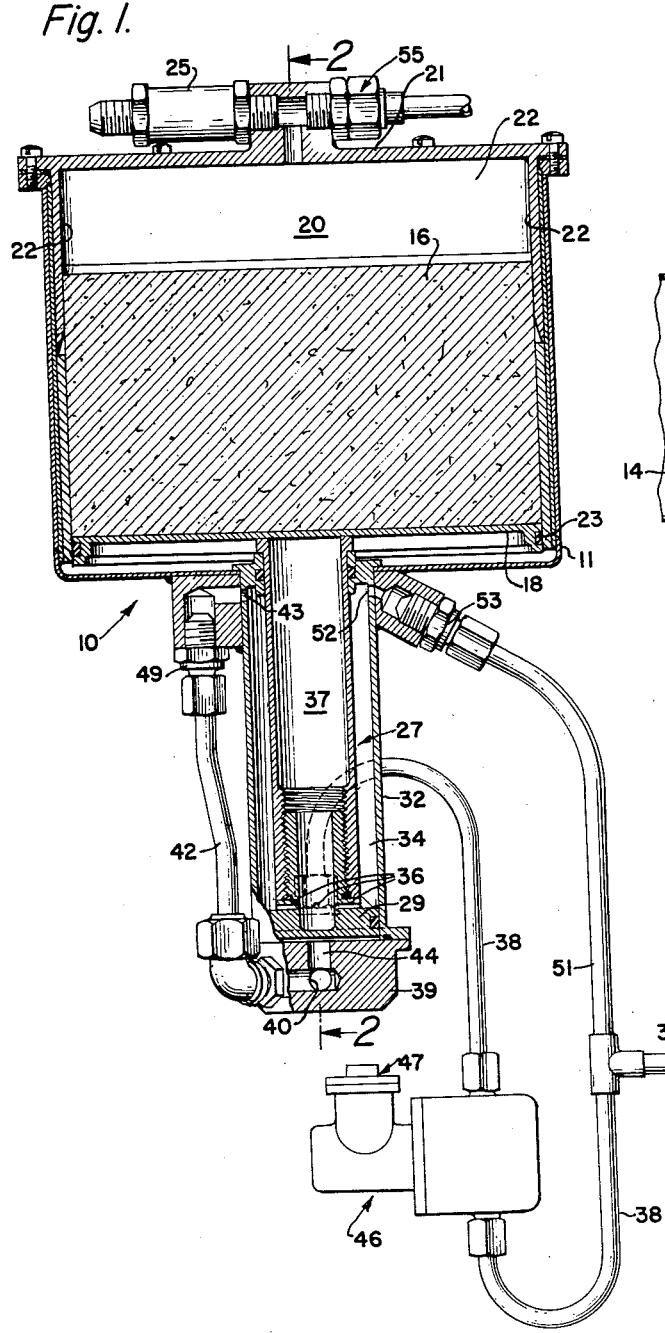
Figure 2:
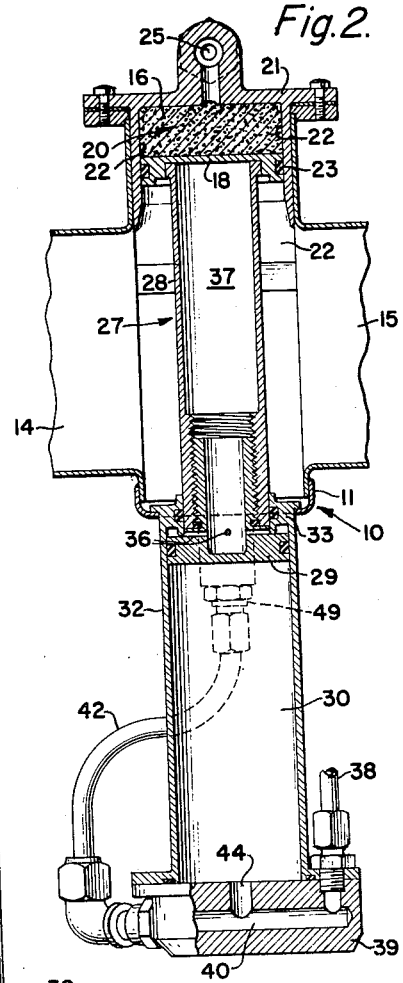

Other and further objects of the invention will be apparent from the disclosure in the following specification, appended claims and drawing wherein:

FIG. 1 is a sectional view of a separator embodying the present invention showing the sponge in position to absorb and accumulate the moisture in the fluid flowing through the separator; and FIG. 2 is a sectional view taken on line 2—2 of FIG. 1 showing the sponge compressed to squeeze the water out of the sponge.

Referring to the drawing, a water separator embodying the present invention is indicated generally at 10. The separator comprises a housing 11 having an inlet 14 for admitting a stream of moisture-laden gas from which entrained liquid particles, such as water, are to be removed, and an outlet 15 through which the dry gas passes from the separator. Disposed within the housing 11 and supported in more or less central relation thereto is a body of porous absorbent material such as, for example, a celluous vinyl sponge 16 adapted to absorb and retain the moisture in the fluid passing therethrough. The sponge 16 is shown rectangular in form, but it is to be understood that it may be any suitable form and dimension.

The sponge 16 is secured at one end to an imperforate plate 18 and is adapted to be reciprocated in the manner hereinafter described into and out of a walled chamber 20 disposed in the housing 11 on one side of the inlet and outlet 14 and 15. The chamber 20 is formed of a cover 21 and a plurality of dependent wall plates 22 arranged to snugly receive the plate 18 when the sponge 16 is moved into the chamber 20. An O-ring 23 is disposed around the periphery of the plate 18 to prevent leakage of the liquid past the plate when the sponge 16 is moved into the chamber 20 and squeezed. The lquid or moisture squeezed out of the sponge 16 is forced through a check valve 25 located in the cover 21 and conducted to a container, not shown, or other place of disposal. The check valve 25 functions to prevent backflow of the liquid into the chamber 20 when the sponge is retracted from the chamber.

An actuator, designated generally by the numeral 27, is provided to effect movement of the sponge 16 into and out of the chamber 20. The actuator includes an inner tubular member 28 secured on one end to the plate 18 and on its opposite end to a piston 29. The piston 29 and the tubular member 28 are arranged to reciprocate within a chamber 30 formed within an outer tubular member 32. The tubular member 28 additionally extends through a guide member 33 to reciprocate the plate 18 in the housing 11. The outer tubular member 32 surrounds and is spaced from the inner tubular member 28 to form an annular chamber 34 which is bounded on one end by the guide member 33 and on the opposite end by the piston 29. One or more vent openings 36 are arranged in the tubular member 28 adjacent the piston 29 to provide communication between the chamber 34 and a chamber 37 formed within the inner tubular member 28.

A conduit 38 is provided for conducting pressurized fluid from a source, not shown, to a closure member 39 secured on one end of the chamber 30. A passageway 40 in the member 39 joins the conduit 38 with a conduit 42 leading to an opening 43 in the outer tubular member 32. A cross passageway 44 leads from the passageway 40 in the member 39 to the chamber 30.

A solenoid valve 46 disposed in the conduit 38 is provided with a vent 47 and is arranged so that the chamber 30 can be supplied with pressurized fluid from the conduit 38 or vented to a region of lower pressure, such as ambient atmosphere, through the vent 47. A check valve 49 is arranged in the conduit 42 to permit equalization of the pressures on the two sides of the piston 29 during the squeeze stroke. A conduit 51 joins an opening 52 in the outer tubular member 32 with the pressure conduit 38 on the upstream side of the solenoid valve 46 and is provided with a check valve 53 to prevent the pressure on top of the piston 29 from exceeding the pressure in the conduit 38.

In operation, when the sponge is in the position shown in FIG. 1, the chamber 30 is vented to a region of lower pressure through the passageways 44 and 40, conduit 38, solenoid valve 46 and vent 47. The water droplets and moisture in the fluid passing through the sponge 16 are retained in the sponge. When it is desired to remove the accumulated moisture from the sponge, the solenoid valve 46 is actuated to shut off the vent 47 and the chamber 30 is supplied with pressurized fluid from the conduit 38 through the passageways 40 and 44. Simultaneously, pressurized fluid is fed through the conduit 42 and opening 43 to the chamber 34, and from the chamber 34 through the openings 36 to the chamber 37 within the inner tubular member 28. The force of the pressurized fluid acts on the entire face of the piston 29 in the chamber 30 and is opposed by the force of the pressurized fluid acting on the portion of the piston 29 in the annular chamber 34. The differential between these two forces moves the piston 29, the tubular member 28, and the plate 18 in an upward direction, as shown in the drawing, so that the sponge 16 is compressed within the chamber 20, as shown in FIG. 2, and the accumulated moisture is squeezed out of the sponge and forced through the check valve 25 to a place of disposal.

When the solenoid 46 is de-energized to return the sponge 16 to the position shown in FIG. 1, the chamber 30 is again vented to a region of lower pressure through the passageways 44 and 40, conduit 38, solenoid valve 46 and vent 47. However, due to the check valves 49 and 53 the upper side of the piston 29 remains pressurized, initially at line pressure. As the piston assembly comprising the plate 18, the tubular member 28 and the piston 29 is initially urged in the downwardly direction, as shown in the drawing, by the expanding sponge, the force of the pressurized fluid on the upper side of the piston 29 acting on that portion of the piston in the annular chamber 34 will augment the force exerted by the expanding sponge and continue the downward movement of the piston assembly. This process involves an expansion in the fluid volume of the pressurized fluid and hence the finalized pressure and the resultant force on the upper side of the piston will be lowered. The upper side of the piston remains pressurized at the lowered pressure until another squeeze stroke is initiated.

As the sponge 16 is retracted from the compressed position in the chamber 20 shown in FIG. 2 to the expanded position shown in FIG. 1, a partial vacuum is created in the chamber 20. To prevent this vacuum from adversely affecting the return of the sponge to the position shown in FIG. 1, a check valve 55 having a connection with the chamber 20 is arranged to permit fluid to flow from a source, such as the ambient atmosphere, into the chamber 20 to relieve the partial vacuum in the chamber.

We claim:

1. Apparatus operable in any attitude or under conditions of zero gravity for collecting and removing liquid entrained in a stream of gaseous fluid, comprising:
   a housing having a cover and a plurality of dependent wall plates;
   an inlet associated with the wall plates of said housing for admitting moisture-laden fluid into said housing;
   an outlet associated with the wall plates of said housing for conveying dry fluid from said housing;
   a body of porous absorbent material normally disposed in said housing in the line of flow of fluid intermediate said inlet and said outlet to absorb the moisture in the fluid;
   an imperforate plate secured on the end of the body of porous absorbent material opposite the cover of said housing;
   a nonreturn valve associated with the cover of said housing and arranged to permit fluid to flow outwardly from said housing;
   means arranged to move said imperforate plate to compress said body of absorbent material between said imperforate plate and the cover of said housing to squeeze the accumulated liquid out of said material;
   and sealing means disposed on said imperforate plate to prevent leakage of fluid between the wall plates of said housing and said imperforate plate whereby the liquid squeezed out of said absorbent material is forced out of said housing through said nonreturn valve.

2. Apparatus operable in any attitude or under conditions of zero gravity for collecting and removing liquid entrained in a stream of gaseous fluid, comprising:
   a housing having a cover and a plurality of dependent wall plates;
   an inlet associated with the wall plates of said housing for admitting moisture-laden fluid into said housing;
   an outlet associated with the wall plates of said housing for conveying dry fluid from said housing;
   a body of porous absorbent material normally disposed in said housing in the line of flow of the fluid intermediate said inlet and said outlet;
   an imperforate plate secured on the end of the body of porous absorbent material opposite the cover of said housing;
   a nonreturn valve associated with the cover of said housing and arranged to permit fluid to flow outwardly from said housing;
   actuator means including a piston connected to said imperforate plate to reciprocally actuate said plate to move said absorbent material between a normally disposed position in the line of flow of fluid intermediate said inlet and said outlet wherein the material absorbs the moisture in the fluid and a position adjacent the cover of said housing wherein the imperforate plate functions to squeeze the accumulated liquid out of said absorbent material;
   and sealing means disposed on said imperforate plate to prevent leakage of fluid between the wall plates of said housing and said imperforate plate whereby the liquid squeezed out of said absorbent material is forced out of said housing through said nonreturn valve.

3. Apparatus operable in any attitude or under conditions of zero gravity for collecting and removing liquid entrained in a stream of gaseous fluid, comprising:
   a housing;
   an inlet for conducting moisture-laden fluid to said housing;
   an outlet for conveying dry fluid from said housing;
   a body of porous absorbent material normally disposed in said housing in the line of flow of fluid intermediate said inlet and said outlet;
   an imperforate plate secured on one end of said porous absorbent material;
   a chamber including walls disposed in said housing outside the line of fluid flow and contiguous the other end of said porous absorbent material;
   means including a nonreturn valve communicating with said chamber and arranged to permit fluid to flow outwardly from said chamber;
   actuator means including a piston connected to said imperforate plate to reciprocally actuate said plate to move said absorbent material between a normally disposed position in said housing in the line of flow of fluid intermediate said inlet and said outlet wherein the material absorbs the moisture in the fluid and a position in said chamber wherein the imperforate plate functions to squeeze the accumulated liquid out of said absorbent material;
   and sealing means disposed on said imperforate plate to prevent leakage of fluid between the walls of said chamber and said imperforate plate whereby the liquid squeezed out of said absorbent material is forced out of said chamber through said nonreturn valve.

4. Apparatus operable in any attitude or under conditions of zero gravity for collecting and removing liquid entrained in a stream of gaseous fluid, comprising:
   a housing;
   an inlet for conducting moisture-laden fluid to said housing;
   an outlet for conveying dry fluid from said housing;
   a body of porous absorbent material normally disposed in said housing in the line of flow of fluid intermediate said inlet and said outlet to absorb the moisture in the fluid;
   an imperforate plate secured on one end of said porous absorbent material;
   a chamber including walls disposed in said housing outside the line of fluid flow and contiguous the other end of said porous absorbent material;
   means including a nonreturn valve communicating with said chamber and arranged to permit fluid to flow outwardly from said chamber;

piston means adapted to be reciprocally actuated in response to fluid pressure to actuate said imperforate plate to move said body of absorbent material from its normally disposed position in said housing in the line of flow of the fluid intermediate said inlet and said outlet into said chamber and compress the material therein to squeeze the accumulated liquid out of said material and to return said body of absorbent material from said chamber to its normally disposed position in said housing;

means for supplying pressurized fluid to actuate said piston means;

and sealing means disposed on said imperforate plate to prevent leakage of fluid between the walls of said chamber and said imperforate plate whereby the liquid squeezed out of said absorbent material is forced out of said chamber through said nonreturn valve.

5. Apparatus operable in any attitude or under conditions of zero gravity for collecting and removing liquid entrained in a stream of gaseous fluid, comprising:

a housing;

an inlet for conducting moisture-laden fluid to said housing;

an outlet for conveying dry fluid from said housing;

a body of porous absorbent material normally disposed in said housing in the line of flow of fluid intermediate said inlet and said outlet to absorb the moisture in the fluid;

an imperforate plate secured on one end of said porous absorbent material;

a chamber including walls disposed in said housing outside the line of fluid flow and contiguous the other end of said porous absorbent material;

means on said housing forming a piston chamber;

piston means connected to said imperforate plate and disposed for movement in said piston chamber;

means for conducting fluid under pressure to the piston chamber to actuate said piston means and said imperforate plate in a direction to move said porous absorbent material into said chamber and compress said material therein;

means including a nonreturn valve communicating with said chamber and arranged to permit fluid to flow outwardly from said chamber;

sealing means disposed on said imperforate plate to prevent leakage of fluid between the walls of said chamber and said imperforate plate whereby the liquid squeezed out of said absorbent material when said material is being compressed in said chamber is forced out of said chamber through said nonreturn valve;

and means for venting the pressure fluid from said piston chamber and actuating said piston means and said imperforate plate in a direction to move said absorbent material out of said chamber and return it to its normally disposed position in said housing intermediate said inlet and said outlet.

References Cited in the file of this patent

UNITED STATES PATENTS

| | | |
|---|---|---|
| 259,041 | Perrett | June 6, 1882 |
| 515,769 | Harris | Mar. 6, 1894 |
| 1,252,872 | Yoggerst et al. | Jan. 8, 1918 |
| 2,798,573 | Vesterdal et al. | July 9, 1957 |

FOREIGN PATENTS

| | | |
|---|---|---|
| 331,840 | Switzerland | Sept. 30, 1958 |